(12) United States Patent
Reed et al.

(10) Patent No.: US 11,281,694 B2
(45) Date of Patent: Mar. 22, 2022

(54) REMOTE DATA CAPTURE IN DATA REPLICATION ENVIRONMENTS

(71) Applicant: International Business Machines Corporation, Armonk, NY (US)

(72) Inventors: David C. Reed, Tucson, AZ (US); Philip R. Chauvet, Tucson, AZ (US); Esteban Rios, Tucson, AZ (US); Thomas C. Reed, Tucson, AZ (US)

(73) Assignee: International Business Machines Cormoration, Armonk, NY (US)

( * ) Notice: Subject to any disclaimer, the term of this patent is extended or adjusted under 35 U.S.C. 154(b) by 61 days.

(21) Appl. No.: 16/507,871

(22) Filed: Jul. 10, 2019

(65) Prior Publication Data

US 2021/0011927 A1 Jan. 14, 2021

(51) Int. Cl.
*G06F 3/06* (2006.01)
*G06F 16/27* (2019.01)
*G06F 11/34* (2006.01)
*G06F 11/20* (2006.01)

(52) U.S. Cl.
CPC .............. *G06F 16/27* (2019.01); *G06F 3/065* (2013.01); *G06F 3/067* (2013.01); *G06F 3/0614* (2013.01); *G06F 3/0653* (2013.01); *G06F 11/2069* (2013.01); *G06F 11/3476* (2013.01)

(58) Field of Classification Search
None
See application file for complete search history.

(56) References Cited

U.S. PATENT DOCUMENTS

| 8,386,850 | B2 | 2/2013 | Riegel et al. |
| 8,904,241 | B2 | 12/2014 | Srivastava et al. |
| 9,430,330 | B1 | 8/2016 | Bardhan |
| 9,465,684 | B1* | 10/2016 | Carter ................. G06F 11/0778 |
| 9,578,005 | B2 | 2/2017 | Lemaster et al. |
| 10,157,347 | B1 | 12/2018 | Kasturi et al. |

(Continued)

OTHER PUBLICATIONS

Semele Data; "The Benefits of Obfuscated vs. Manufactured Data"; Retrieved from https://query.prod.cms.rt.microsoft.com/cms/api/am/binary/RE3hnnR; Apr. 16, 2018, pp. 1-5. (Year: 2018).*

(Continued)

*Primary Examiner* — Tracy A Warren
*Assistant Examiner* — Eric T Loonan
(74) *Attorney, Agent, or Firm* — Nelson IP; Daniel P. Nelson

(57) ABSTRACT

A method for more effectively utilizing computing resources in a data replication environment is disclosed. In one embodiment, such a method detects, at a primary system, activity occurring on the primary system. This activity is recorded in systems logs located at the primary system. The method automatically mirrors the system logs from the primary system to a secondary system that is in a mirroring relationship with the primary system. The system logs are analyzed at the secondary system. In the event abnormal activity is detected in the system logs at the secondary system, the method identifies, on the secondary system, a data set that is associated with the abnormal activity. A snapshot is taken of this data set and saved on the secondary system for later analysis. A corresponding system and computer program product are also disclosed.

20 Claims, 11 Drawing Sheets

(56) References Cited

U.S. PATENT DOCUMENTS

| | | |
|---|---|---|
| 2009/0193298 A1 | 7/2009 | Mukherjee |
| 2011/0264956 A1 | 10/2011 | Ito et al. |
| 2012/0297251 A1* | 11/2012 | Masser ............... G06F 11/3688 |
| | | 714/37 |
| 2012/0303773 A1 | 11/2012 | Rodrigues |
| 2014/0245070 A1* | 8/2014 | Rumble .............. G06F 11/3688 |
| | | 714/38.14 |
| 2018/0220312 A1 | 8/2018 | Guttenfelder et al. |

OTHER PUBLICATIONS

List of IBM Patents or Patent Applications Treated as Related.
ComputerHope.com; Definitions of "data dump" and "snapshot"; Retrieved from "https://www.computerhope.com/argon/d/data-dump.htm" and "https://www.computerhope.com/jargon/s/snapshot.htm". (Year: 2021).

\* cited by examiner

REMOTE DATA CAPTURE IN DATA REPLICATION ENVIRONMENTS

BACKGROUND

Field of the Invention

This invention relates to data replication environments, and more particularly to apparatus and methods to more effectively utilize computing resources in data replication environments.

Background of the Invention

Computing systems produce data that is often susceptible error. For example, in network environments, where multiple users access the same production data, perhaps concurrently, the susceptibility to error is high. Analyzing the production data allows for the diagnosis and potentially correction of errors that may occur when the production data is generated or operations are performed thereon. Data analysis may be performed in various ways and at different times to ensure data integrity.

Data analysis, however, cannot be performed without costs. For example, when tracing is performed or when data is gathered through analysis techniques, the data is typically collected and analyzed on the same production system where the production applications are running. This generates additional overhead against the central processing unit (CPU) and direct access storage device (DASD) of the production system. The additional overhead is often prohibitive and may create an undesirable tradeoff between data integrity and processing speeds. Often, data integrity is sacrificed for higher processing speeds.

In data replication environments such as IBM's Metro or Global Mirror, production data is mirrored from a primary storage system to a secondary storage system to maintain two consistent copies of the data. The primary and secondary storage systems may be located at different sites, perhaps hundreds or even thousands of miles away from one another. In the event the primary storage system fails, I/O may be redirected to the secondary storage system (a process referred to as a failover), thereby enabling continuous operations. Nevertheless, the secondary system (i.e., secondary host system and/or secondary storage system) to which production data is mirrored often includes computing resources that are underutilized under normal operating conditions.

In view of the foregoing, apparatus and methods are needed to more effectively utilize computing resources located on a secondary system. Ideally, the secondary system may be utilized to assist with or perform tasks normally performed by a primary system.

SUMMARY

The invention has been developed in response to the present state of the art and, in particular, in response to the problems and needs in the art that have not yet been fully solved by currently available systems and methods. Accordingly, embodiments of the invention have been developed to more effectively utilize computing resources in a data replication environment. The features and advantages of the invention will become more fully apparent from the following description and appended claims, or may be learned by practice of the invention as set forth hereinafter.

Consistent with the foregoing, a method for more effectively utilizing computing resources in a data replication environment is disclosed. In one embodiment, such a method detects, at a primary system, activity occurring on the primary system. This activity is recorded in systems logs located at the primary system. The method automatically mirrors the system logs from the primary system to a secondary system that is in a mirroring relationship with the primary system. The system logs are analyzed at the secondary system. In the event abnormal activity is detected in the system logs at the secondary system, the method identifies, on the secondary system, a data set that is associated with the abnormal activity. A snapshot is taken of this data set and saved on the secondary system for later analysis.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
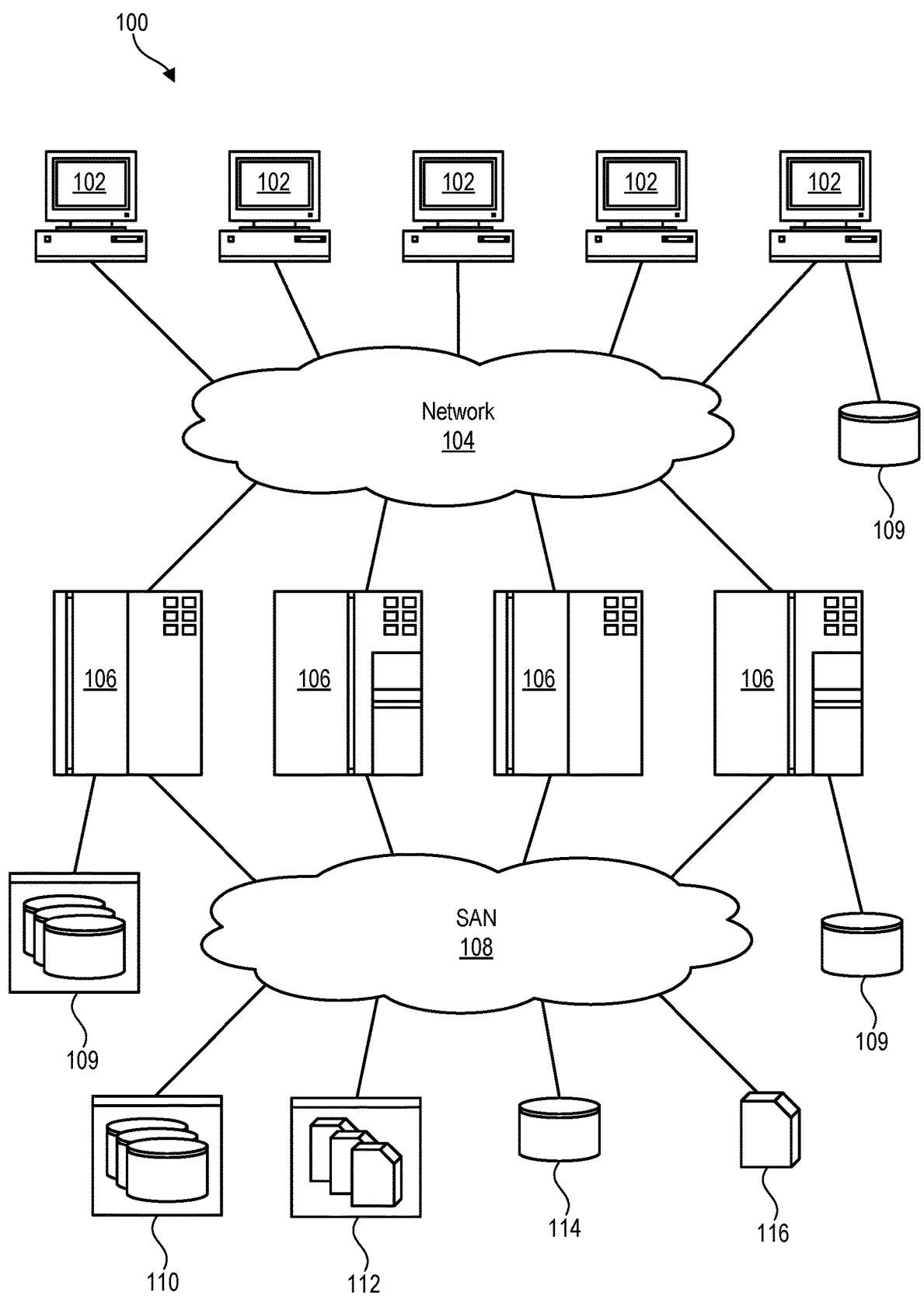
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 109 (e.g., arrays of hard-storage drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard or protocol such as Fibre Channel (FC) or iSCSI.

Figure 2:
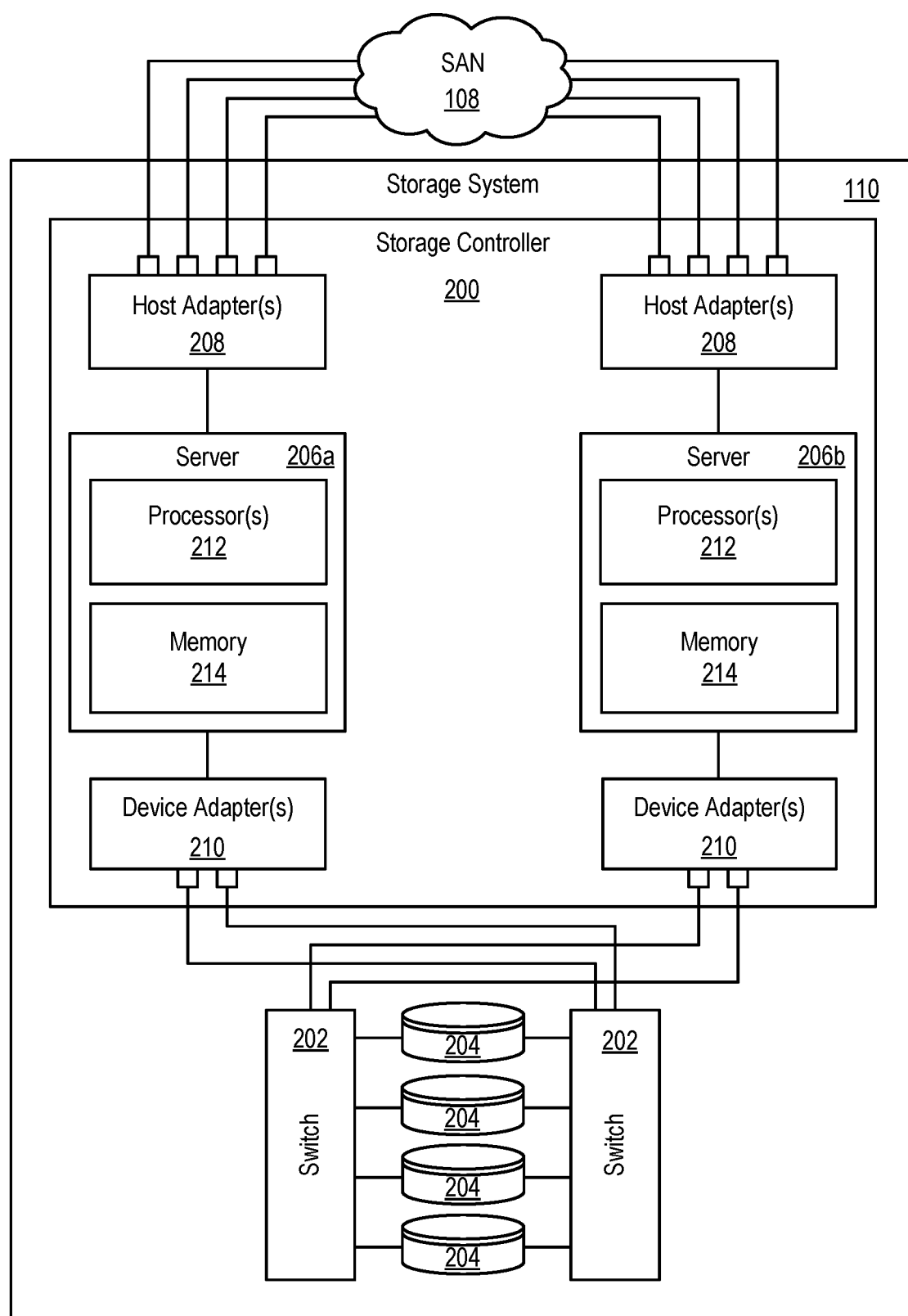
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes 322 implemented on the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
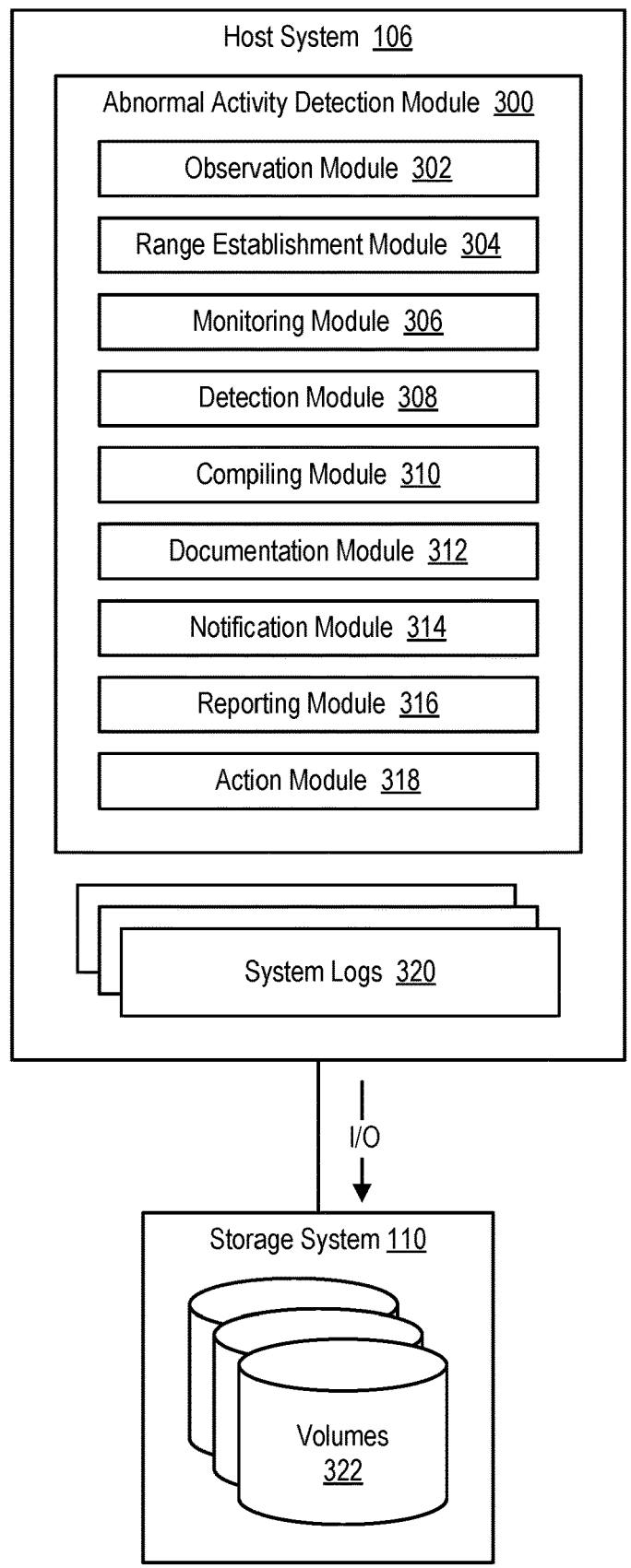
FIG. 3 is a high-level block diagram showing an abnormal activity detection module in accordance with the invention.

Referring to FIG. 3, as previously mentioned, in many types of computing systems, such as host systems 106 and/or storage systems 109, 110, 112, 114, 116, various types of events and activity may occur on a regular and/or recurring basis. In some cases, these events and activity may include errors or other issues that, while possibly indicating some problem on the computing system, are not critical to the computing system and will not affect the overall performance or mission of the computing system. In certain cases, these errors or other issues may be considered "normal" on a computing system, or within a normal range of activity on the computing system.

For example, a computing system may exhibit underlying issues such as bugs, error messages, abnormal terminations, or the like that, while possibly distracting or annoying to user, may be recovered from or addressed without preventing the computing system from performing its primary functions. The underlying issues may be the result of the computing system executing old code levels, operating hardware with slight or insignificant incompatibilities, communicating with external systems exhibiting problems or incompatibilities, and/or the like.

In view of the foregoing, systems and methods are needed to detect, within a computing system, events and activity that may occur on a regular and/or recurring basis. Further needed are systems and methods to determine which activity may be considered "normal" on a computing system, or within a normal range of activity on the computing system. Yet further needed are systems and methods to determine when events or activity fall outside of what is considered a normal range of activity.

In certain embodiments, in order to achieve the objectives set forth above, a computing system may be configured with an abnormal activity detection module 300 in accordance with the invention. In the illustrated embodiment, the abnormal activity detection module 300 is shown within a host system 106, although it is not limited to implementation within a host system 106. The abnormal activity detection module 300 may include various sub-modules to provide various features and functions. The abnormal activity detection module 300 and associated sub-modules may be implemented in hardware, software, firmware, or combinations thereof. The abnormal activity detection module 300 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules. As shown, the abnormal activity detection module 300 includes one or more of an observation module 302, range establishment module 304, monitoring module 306, detection module 308, compiling module 310, documentation module 312, notification module 314, reporting module 316, and action module 318.

The observation module 302 may be configured to observe, over a period of time (e.g., one month, ninety days, etc.), activity that occurs on a computing system, such as the illustrated host system 106 and/or storage system 110. In certain embodiments, the period of time may be selected to enable the observation module 302 to sufficiently learn activity that normally occurs on the computing system. During the period of time, the observation module 302 may observe activity such as I/O amounts, I/O performance, error conditions, job volumes, job durations, job start/end events, resource usage (e.g., memory usage), or the like, as well as the times, days, and/or frequency that each of the activities occur. In making the observations, the observation module 302 may, in certain embodiments, analyze system logs 320 such as LOGREC logs, RMF/SMF data logs, job logs, and the like. These system logs 320 may, in certain embodiments, be written to one or more volumes 322 of the storage system 110. In certain embodiments, the observation module 302 is configured to analyze system logs 320 during periods of low system activity in order to minimize any impact on the computing system. To reduce demands on the computing system, the observation module 302 may, in certain embodiments, enable a user to restrict the amounts or types of activity that are observed.

From the activity observed by the observation module 302, the range establishment module 304 may establish a normal range for the activity. For example, the range establishment module 304 may establish a normal range for observed I/O amounts, I/O performance, error conditions, job volumes, job durations, job start/end events, resource usage, or the like. The range establishment module 304 may also establish the times, days, and/or frequency in which these different activities normally occur. As an example, the range establishment module 304 may construct a high-level picture of what jobs normally run during certain periods of time, the amount of resources the jobs use, normal completion times for the jobs, and/or common errors or messages that occur during these periods of time.

Certain activity, which may be considered rare or abnormal on some computing systems, may be considered normal or routine on other computing systems. The range establishment module 304 may, in certain embodiments, classify certain activity (errors, etc.) as being normal or within a range of normal activities on a computing system even though it might be considered abnormal or unusual on another computing system.

Once normal ranges are established, the monitoring module 306 may monitor the computing system (e.g., the host system 106 and/or the storage system 110) for activity. The detection module 308 may detect when activity falls outside the normal ranges. For example, the detection module 308 may detect when I/O amounts, I/O performance, error conditions, job volumes, job durations, job start/end events, memory usage, or the like, fall outside normal ranges. The detection module 308 may also, in certain embodiments, detect when such activity occurs at times, days, and/or frequencies outside of what is normally observed.

When activity is detected that falls outside normal ranges, the compiling module 310 may compile information associated with the detected abnormal activity. In certain embodiments, this may include gathering data from various system logs 320. Information gathered may include, for example, hardware devices, job names, data sets (i.e., named collections of records), logical partitions (LPARS), times/dates, sources, or the like that are associated with or have some connection to the abnormal activity. In certain embodiments, when abnormal activity is detected, the compiling module 310 may issue system queries to system logs 320 or data stores to gather additional information associated with the abnormal activity.

Once the compiling module 310 has gathered and/or compiled information associated with the abnormal activity, the documentation module 312 may document the abnormal activity. This may include documenting events, systems states, settings, and the like, associated with or surrounding the abnormal activity. In certain embodiments, when abnormal activity is detected, a notification module 314 may notify a user (e.g., system administrator) using a message such as an email or text message. In certain embodiments, a reporting module 316 may generate a report that details abnormal activity and events, systems states, settings, and the like, associated with or surrounding the abnormal activity. This report may be formatted to facilitate quick and easy review by a user. Any or all of the information gathered by the compiling module 310 may be included in the report.

In certain embodiments, an action module 318 may be configured to take various actions. For example, when abnormal activity is detected on a computing system (e.g., a host system 106 and/or the storage system 110), the action module 318 may take actions such as taking snapshots of data sets that are associated with abnormal activity, for later analysis. As will be explained in more detail in association with FIGS. 8 through 11, where the abnormal activity detection module 300 is implemented on secondary system in a data replication environment, the action module 318 may also perform actions such as send commands to a primary system to gather additional information with regard to abnormal activity, or to tune the primary system to prevent or reduce the abnormal activity.

Figure 4:
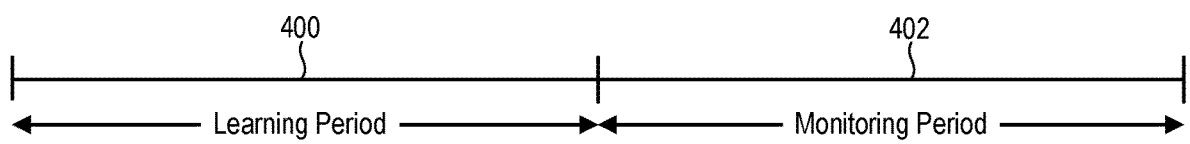
FIG. 4 is a timeline showing a learning period and a monitoring period.
Figure 5:
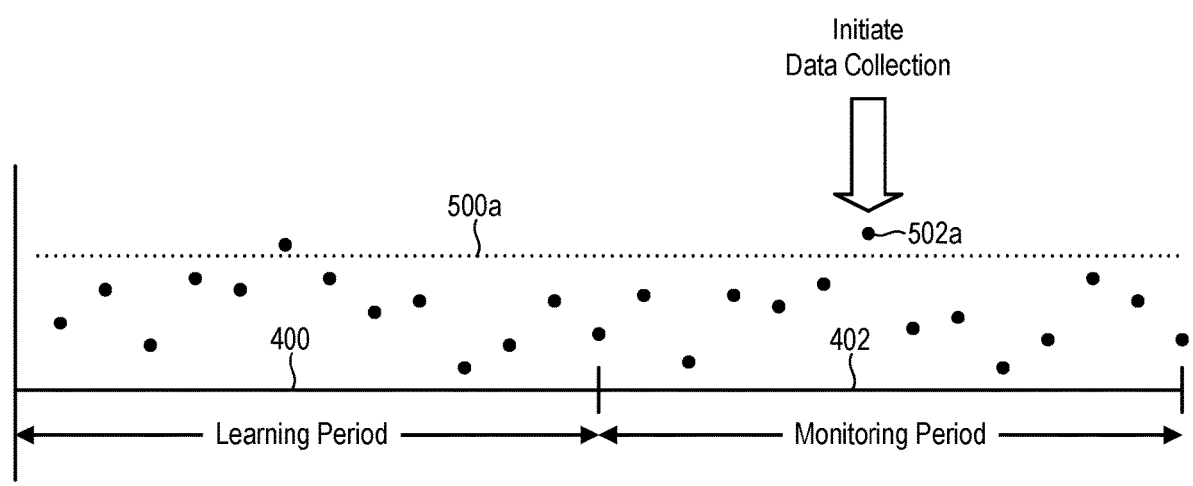
FIG. 5 is a timeline showing the detection of activity that falls outside a normal range.
Figure 6:
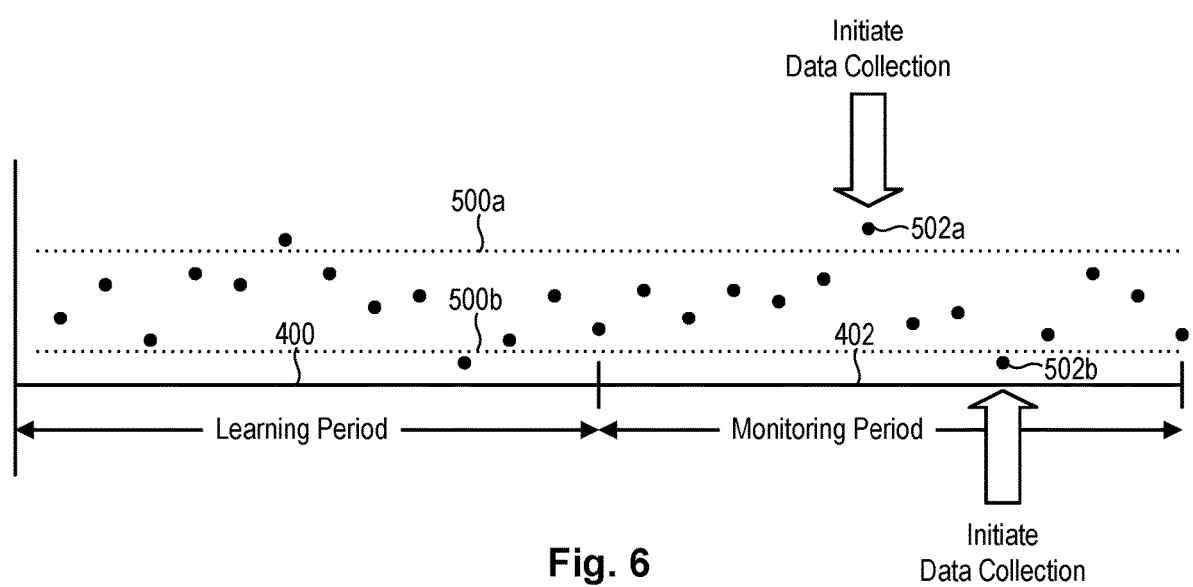
FIG. 6 is a timeline also showing the detection of activity that falls outside a normal range.

Referring to FIG. 4, as shown, the abnormal activity detection module 300 may be characterized by a learning period 400 and a monitoring period 402. During the learning period 400, the abnormal activity detection module 300 learns activity that normally occurs on a computing system, including activity that might be considered abnormal on other computing systems. During the learning period 400, the abnormal activity detection module 300 establishes normal ranges for the observed activity. The abnormal activity detection module 300 may then initiate the monitoring period 402 wherein activity is monitored on the computing system. During the monitoring period 402, the abnormal activity detection module 300 may look for activity that falls outside the normal ranges. For example, as shown in FIG. 5, if, during the monitoring period 402, the abnormal activity detection module 300 detects an event 502a that is above a normal range (in this example above an upper threshold 500a), the abnormal activity detection module 300 may initiate collection of data associated with the event 502a. Similarly, as shown in FIG. 6, if, during the monitoring period 402, the abnormal activity detection module 300 detects an event 502b that is below a normal range (in this example below a lower threshold 500b), the abnormal activity detection module 300 may also initiate collection of data associated with the event 502b.

Figure 7:
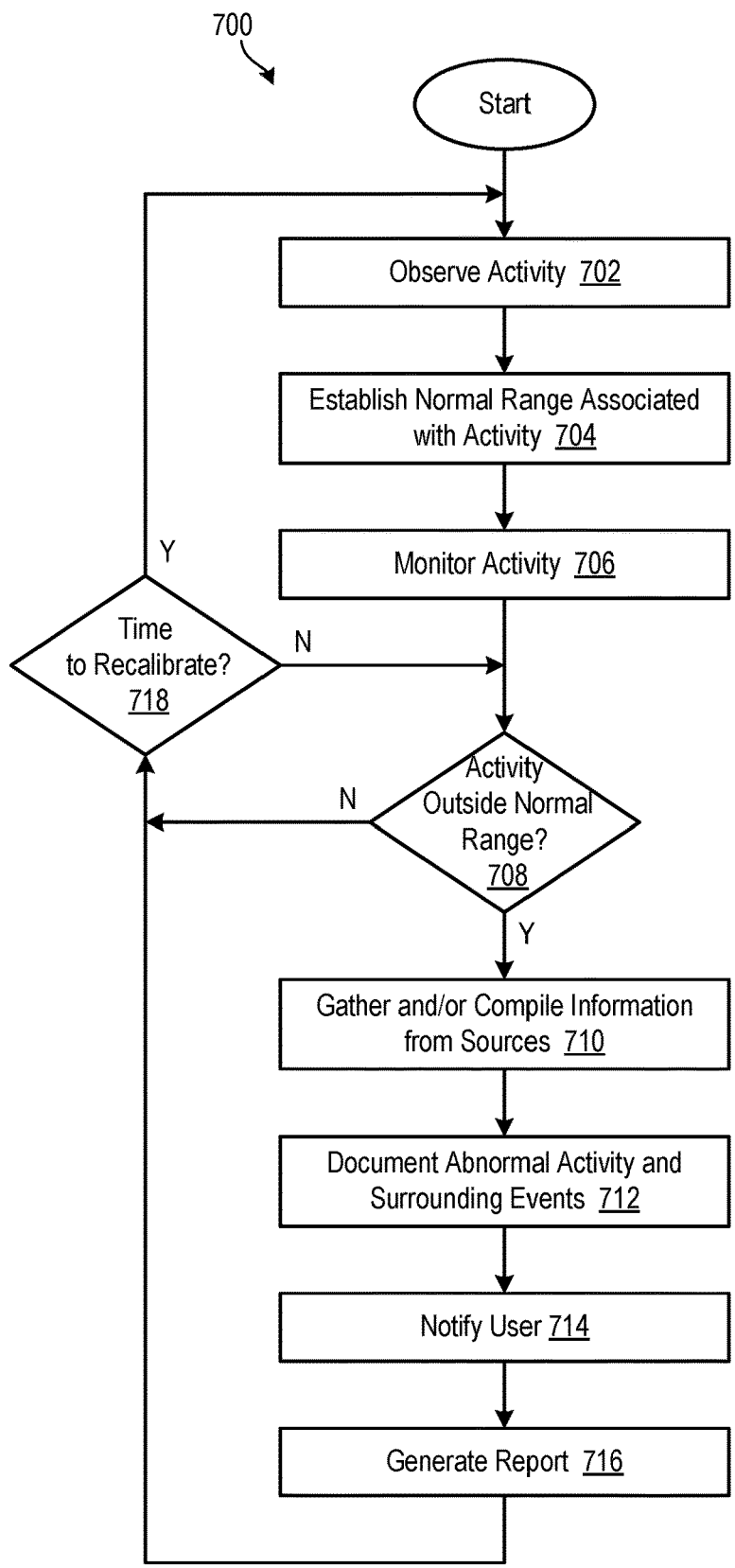
FIG. 7 is a flow diagram showing one embodiment of a method for detecting abnormal activity occurring on a computing system.

Referring to FIG. 7, one embodiment a method 700 for detecting abnormal activity occurring on a computing system is illustrated. Such a method 700 may, in certain embodiments, be executed by an abnormal activity detection module 300 in accordance with the invention. As shown, the method 700 initially observes 702 activity occurring on a computing system. This activity may include, for example, I/O amounts, I/O performance, error conditions, job volumes, job durations, job start/end events, resource usage, and/or the like, as well as times, days, and/or frequencies in which the activities are observed. In certain embodiments, the method 700 observes 702 activities occurring on the computing system by analyzing system logs 320.

The method 700 then establishes 704 normal ranges with respect to the observed activity. For example, the method 700 may establish 704 normal ranges with respect to I/O amounts, I/O performance, error conditions, job volumes, job durations, job start/end events, resource usage, and/or the like, as well as times, days, and/or frequencies for the activities that are observed. In certain embodiments, the steps 702, 704 are performed during the learning period 400 previously described in order to acquire information about normal or customary activities on a computing system.

Once the learning period 400 has completed, the method 700 initiates a monitoring period 402. During the monitoring period 402, the method 700 monitors 706 activity that occurs on the computing system. During this monitoring period 402, the method 700 determines 708 whether activity that occurs on the computing system falls outside a normal range. If so, the method 700 gathers 710 and/or compiles 710 information from sources such as system logs 320 to provide information on causes or sources of the abnormal activity. The method 700 documents 712 the abnormal activity and events surrounding or associated with the abnormal activity. In certain embodiments, the method 700 notifies 714 a user of the abnormal activity and/or generates 716 a report documenting the abnormal activity. The method 700 then returns to step 708 to determine whether any activity on the computing system falls outside a normal range.

Periodically, such as every interval (e.g., every year) or after configuration changes have occurred on a computing system, the method 700 recalibrates 718. That is, the method 700 repeats the learning period 400 to observe what is considered normal on the computing system. This may be performed because, over time and with configuration changes (e.g., hardware or code level updates) to the computing system, what is considered normal activity on a computing system may change. Certain events that were formerly considered normal may no longer be considered normal and vice versa.

Embodiments of the invention may be used in various use cases as set forth below. For example, embodiments of the invention may analyze LOGREC records to determine what type of activity is normal on a system (e.g., host system 106 and/or storage system 110). LOGREC data may contain records that are created when hardware or software errors occur. However, as previously explained, some types of abnormal events may be common on some systems. What may be common on one system may be quite rare on another system. LOGREC data summarizes events and activity that have occurred on a system over a period of time such as a twenty-four hour window. Over a ninety day period, threshold values describing what is considered normal may be established.

Embodiments of the invention may also analyze system logs 320. The volume of data in system logs 320 during a twenty-four hour window may be quite large. Thus, in certain embodiments, embodiments of the invention may enable a user to specify what types of activity to analyze, such as ABENDS, specific return codes, attributes related to specific jobs, or the like. RMF/SMF data may also contain valuable performance data such as I/O-related statistics. Using this data, an expected range of values (i.e., normal ranges) may be established for devices (e.g., storage drives 204). Also, performance attributes related to specific jobs may be established such as elapsed time, CPU time, EXCP count, and other attributes. Data from specific job logs may also be analyzed for specific return codes to establish what is expected and what is unusual.

After data is gathered from various sources, such as those set forth above, the data may be merged based on time and date into intervals such as fifteen minute intervals. Each interval may provide a summary of what occurred during the interval that was outside of normal ranges. Specific events may be listed along with information indicating where more details are located. For example, if a high volume of out-of-memory dumps occurred during an interval, the number of dumps along with their times may be listed. The first dump that occurred during that interval may be of primary interest. Important pieces of information, such as the first time a specific event occurred, may be merged into a daily summary view. This may enable a user to determine the first time a specific event occurred during a twenty-four hour window. This data may be written to a data set that stores a report for each day. The user may, in certain embodiments, specify how many days of reports to keep or how much data to retain, or specify permanent retention that may cause the data to be archived.

Another use case involves several jobs that take longer than normal to complete. Using historical data that is collected for the jobs, the historical data may be analyzed to determine what attributes of the jobs are outside of normal. For example, total CPU usage may be slightly higher than normal, while an elapsed time and Execute Channel Program (EXCP) count indicating additional I/O may be much higher than normal or I/O response times may be outside of normal. This may indicate that more data than normal is being processed by a job, or perhaps there are issues with channels or storage hardware. This may then lead to an analysis of RMF data to determine if any statistics for involved devices (e.g., storage drives 204) are outside of their expected values. If these values are normal, then the analysis may focus on the amount of data processed. A report documenting the analysis and recommended next steps may then be generated.

When an impactful widespread error event occurs, a report may be generated that focuses on events that were unusual and led up to the widespread error event in question. The report may highlight values that are outside of an expected range along with an indication or metric of what is considered to be normal. This information may be reviewed by a user for products the user has in his or her environment. The user may also review this information on a daily basis to determine what events are outside of what is expected.

Figure 8:
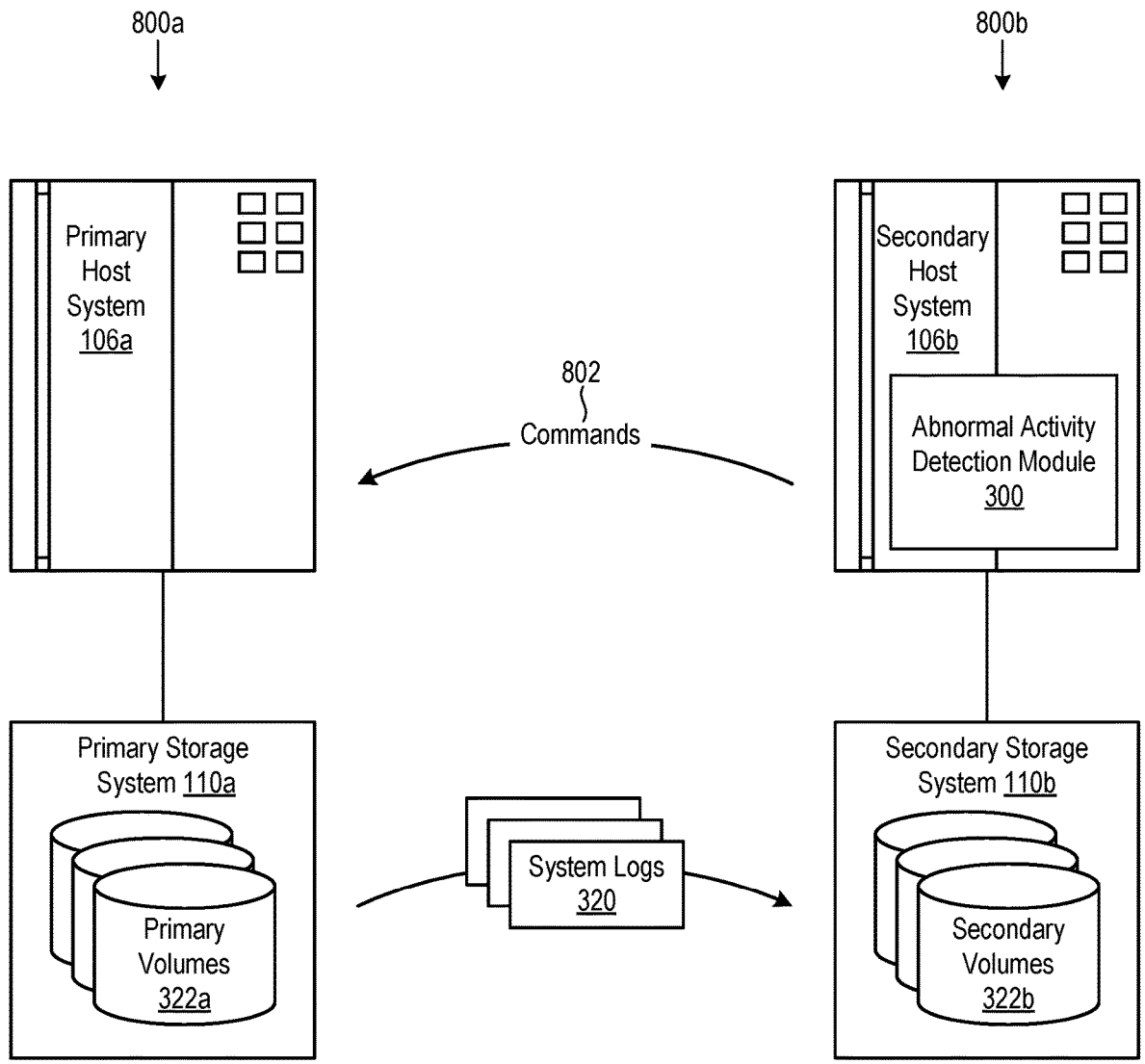
FIG. 8 is a high-level block diagram showing one embodiment of the invention implemented within a data replication system.

Referring to FIG. 8, in certain embodiments, apparatus and methods in accordance with the invention may be implemented in a data replication system such as IBM's Metro or Global Mirror. In such systems, production data is mirrored from a primary storage system 110a to a secondary storage system 110b to maintain two consistent copies of the production data. The primary and secondary storage systems 110a, 110b may be located at different sites, perhaps hundreds or even thousands of miles away from one another. In the event the primary storage system 110a fails, I/O may be redirected to the a secondary storage system 110b (a process referred to as a failover), thereby enabling continuous operations. Under normal operating conditions, the primary system 800a (i.e., the primary host system 106a and primary storage system 110a) handles most of the I/O workload and computing resources (e.g., CPU, memory, etc.) on the secondary system 800b (i.e., the secondary host system 106b and the secondary storage system 110b) are underutilized.

In certain embodiments, in order to more effectively utilize computing resources in a data replication environment, all of part of the abnormal activity detection module 300 previously described may be implemented on the secondary system 800b. As activity occurs on the primary system 800a, system logs 320 may be generated that describe the activity. These system logs 320 may be stored in primary volumes 322a located on the primary storage system 110a, and then mirrored to secondary volumes 322b located on the secondary storage system 110b. Thus, the secondary system 800*b* may have access to system logs 320 that describe activity occurring on the primary system 800*a*.

In order reduce load on the primary system 800*a*, the secondary system 800*b*, and more specifically the abnormal activity detection module 300 located on the secondary system 800*b*, may be configured to learn activity that normally occurs on the primary system 800*a*. This may be accomplished by analyzing the system logs 320 that reside on the secondary system 800*b*. Once normal ranges are established, the secondary system 800*b* may monitor activity on the primary system 800*a* by analyzing the system logs 320. In the event activity is detected that is abnormal or falls outside the normal ranges, the secondary system 800*b* may take various actions to address the abnormal activity.

For example, as shown in FIG. 8, the secondary system 800*b* may send commands 802 to the primary system 800*a* to trigger actions on the primary system 800*a*. For example, the commands 802 may trigger additional data collection (e.g., storage dumps, state saves, requests regarding resource contention etc.) on the primary system 800*a* in order to determine the cause of the abnormal activity. This additional data may be written to system logs 320 or other data sets that are then mirrored to the secondary system 800*b*. The secondary system 800*b* and more particularly the abnormal activity detection module 300 on the secondary system 800*b* may analyze this additional data to determine the cause of the abnormal activity. In other embodiments, the commands 802 may include tuning commands that make adjustments or configuration changes on the primary system 800*a*. For example, the commands 802 may cancel or modify jobs on the primary system 800*a* that may be causing issues such as resource contention. If the commands 802 can be executed on the secondary system 800*b* to capture the same or similar data, the commands 802 may be executed on the secondary system 800*b* to reduce load on the primary system 800*a*.

Figure 9:
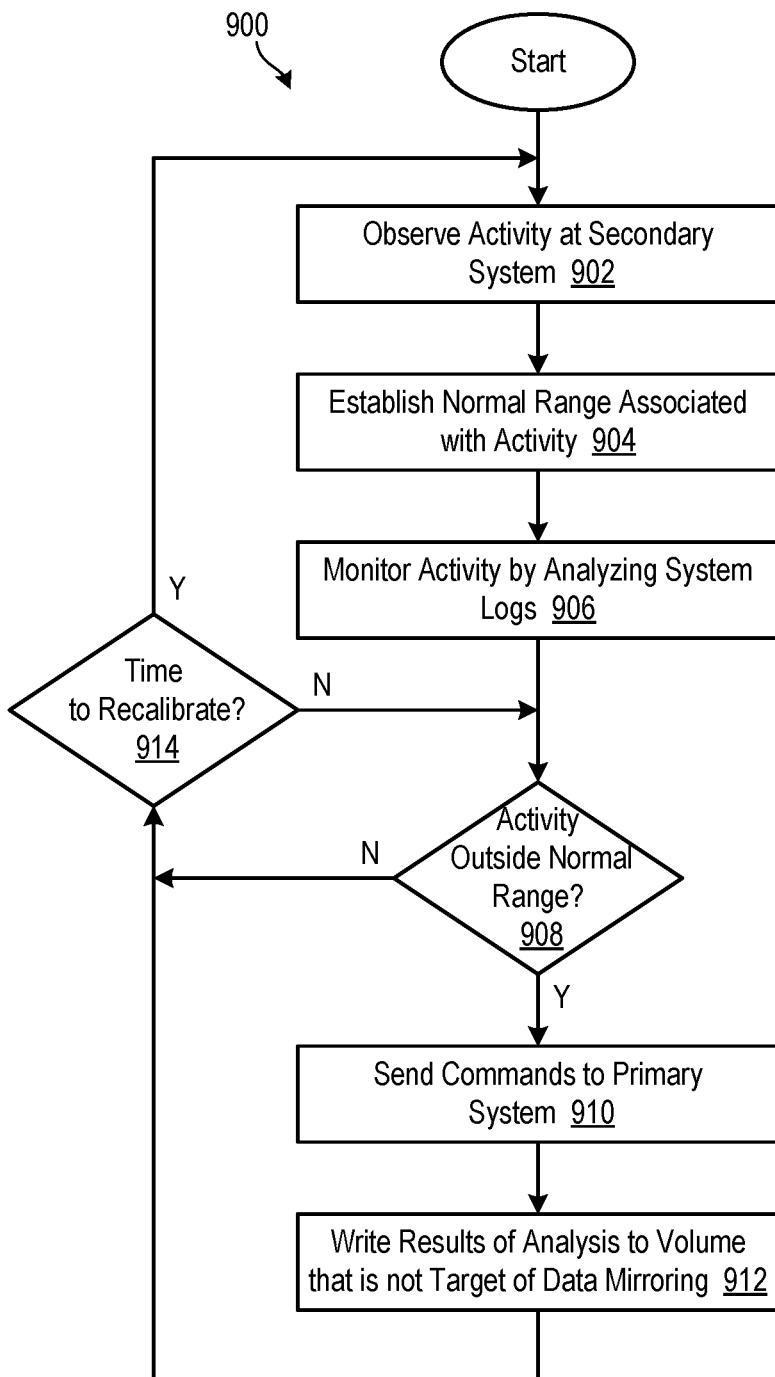
FIG. 9 is a flow diagram showing a method that may be executed by the data replication environment of FIG. 8.

Referring to FIG. 9, one embodiment of a method 900 that may be executed in the data replication environment of FIG. 8 is illustrated. More specifically, such a method 900 may be executed by the secondary system 800*b*. As shown, the secondary system 800*b* initially observes 902 activity that occurs on the primary system 800*a*. In certain embodiments, this may be accomplished by analyzing system logs 320 that are mirrored from the primary system 800*a* to the secondary system 800*b*. Upon observing this activity, the secondary system 800*b* establishes 904 normal ranges for the observed activity. In general, steps 902 and 904 may be considered a learning period 400 wherein the secondary system 800*b* learns what is considered normal of the primary system 800*a*.

The secondary system 800*b* may then monitor 906 activity that occurs on the primary system 800*a* by analyzing system logs 320 that are mirrored from the primary system 800*a* to the secondary system 800*b*. In the event the secondary system 800*b* detects 908 activity that falls outside the normal ranges, the secondary system 800*b* sends 910 commands 802 to the primary system 800*a* to perform various actions thereon. These commands 802 may trigger data collection on the primary system 800*a* such as gathering of system dumps or state saves. This data may be written to the primary volumes 322*a* and mirrored to the secondary volumes 322*b* for further analysis and data collection by the secondary system 800*b*. In other embodiments, the commands 802 perform tuning operations on the primary system 800*a* to address, remedy, or prevent future occurrences of the abnormal activity. Periodically, such as every interval (e.g., every year) or after configuration changes have occurred on the primary system 800*a*, the secondary system 800*b* may recalibrate 914 by repeating the learning period 400 and thereby observing what is considered normal on the primary system 800*a*.

Referring to FIG. 9, one embodiment of a method 900 that may be executed by the data replication environment of FIG. 8 is illustrated. More specifically, such a method 900 may be executed by the secondary system 800*b*. As shown, the secondary system 800*b* initially observes 902 activity that is occurring on the primary system 800*a*. In certain embodiments, this may be accomplished by analyzing system logs 320 that are mirrored from the primary system 800*a* to the secondary system 800*b*. Upon observing this activity, the secondary system 800*b* may establish 904 normal ranges for activity that is observed on the primary system 800*a*. In general, steps 902 and 904 may be considered a learning period 400 wherein the secondary system 800*b* learns the normal operation of the primary system 800*a*.

The secondary system 800*b* may then monitor 906 activity that occurs on the primary system 800*a* by analyzing system logs 320 that are mirrored from the primary system 800*a* to the secondary system 800*b*. In the event the secondary system 800*b* detects 908 activity that falls outside the normal ranges, the secondary system 800*b* may send commands 802 to the primary system 800*a* to perform various actions thereon. For example, the commands 802 may trigger data collection on the primary system 800*a* such as gathering of system dumps or state saves. This data may be written to the primary volumes 322*a* and mirrored to the secondary volumes 322*b* for further analysis and data collection by the secondary system 800*b*. In other embodiments, the commands 802 perform tuning operations on the primary system 800*a* to address or remedy the abnormal activity. Periodically, such as every interval (e.g., every year) or after configuration changes have occurred on the primary system 800*a*, the secondary system 800*b* recalibrates 914 by repeating the learning period 400 to observe what is considered normal on the primary system 800*a*.

Figure 10:
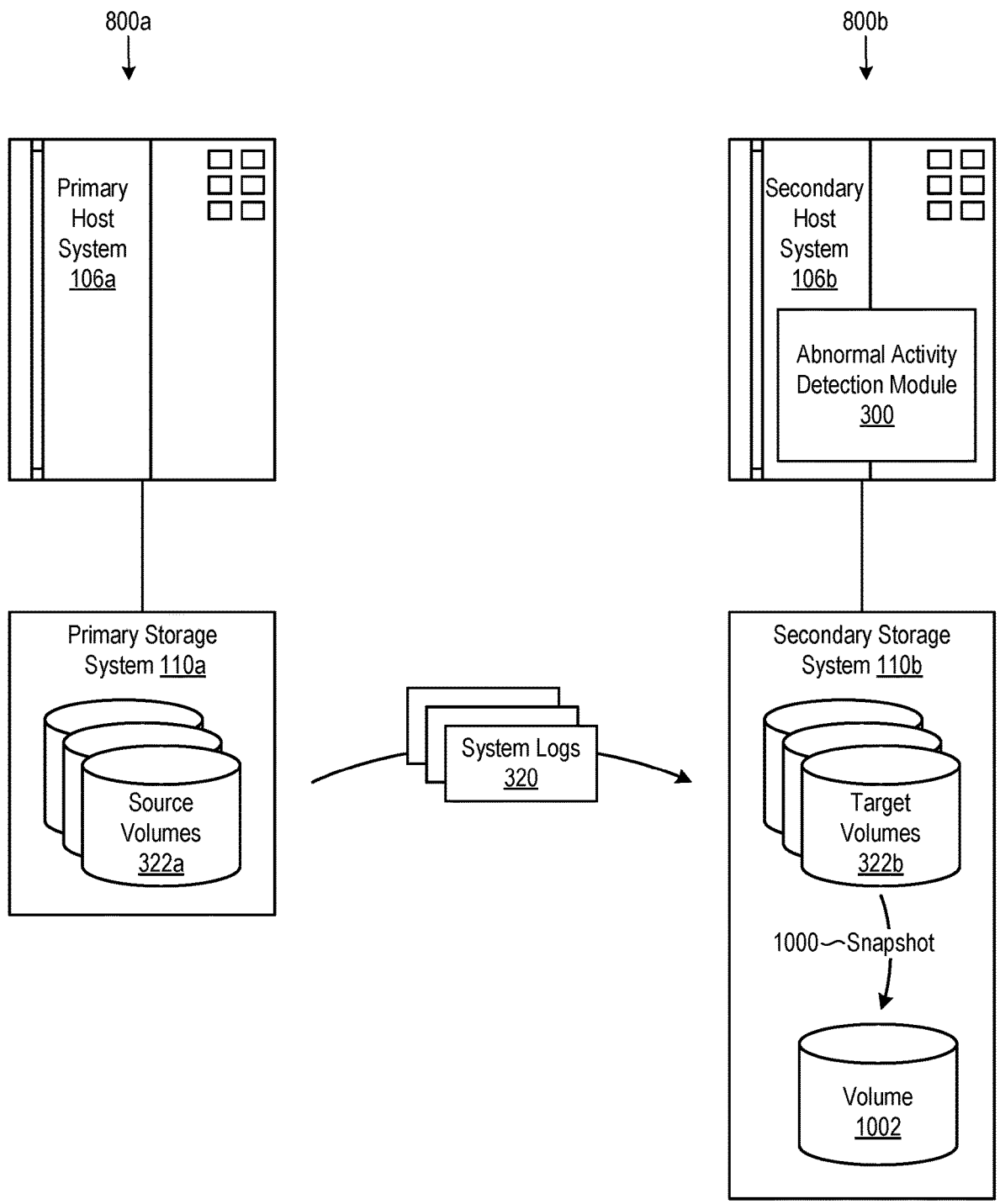
FIG. 10 is a high-level block diagram showing another embodiment of the invention implemented within a data replication system.

Referring to FIG. 10, in an alternative embodiment, instead of or in addition to sending commands 802 to the primary system 800*a*, the secondary system 800*b* may perform other actions when abnormal activity is detected on the primary system 800*a*. For example, when abnormal activity is detected on the primary system 800*a*, the secondary system 800*b* may capture data (e.g., data sets) that may be related to the abnormal activity. Because data sets are mirrored from the primary volumes 322*a* to the secondary volumes 322*b*, any related data sets (and any errors, data overlays, or data corruption contained therein) may be duplicated to the secondary system 800*b*. Thus, in certain embodiments, when abnormal activity is detected on the primary system 800*a*, the secondary system 800*b* may determine which data sets are related to the abnormal activity and capture (e.g., take a snapshot 1000) of these data sets for later analysis.

In certain embodiments, the snapshot 1000 may be saved to a volume 1002 on the secondary system 800*b* that is not a target of data mirroring, thereby ensuring that the snapshot 1000 will not be overwritten prior to analyzing its data. In certain embodiments, the data sets may be analyzed for errors, data overlays, data corruption, or the like. Such conditions may be indicated by return codes that are generated during open or close processing on the data sets, or during write activity to the data sets. In certain embodiments, commands 802 may be executed on the secondary system 800*b* to examine and verify data in the data sets. Once analysis is performed on the data sets by the secondary system 800*b*, the results of the analysis may, in certain embodiments, be written to a volume 1002 that is not a target of data mirroring. This may allow the results to be examined by a user and/or used to generate a report detailing the analysis.

Figure 11:
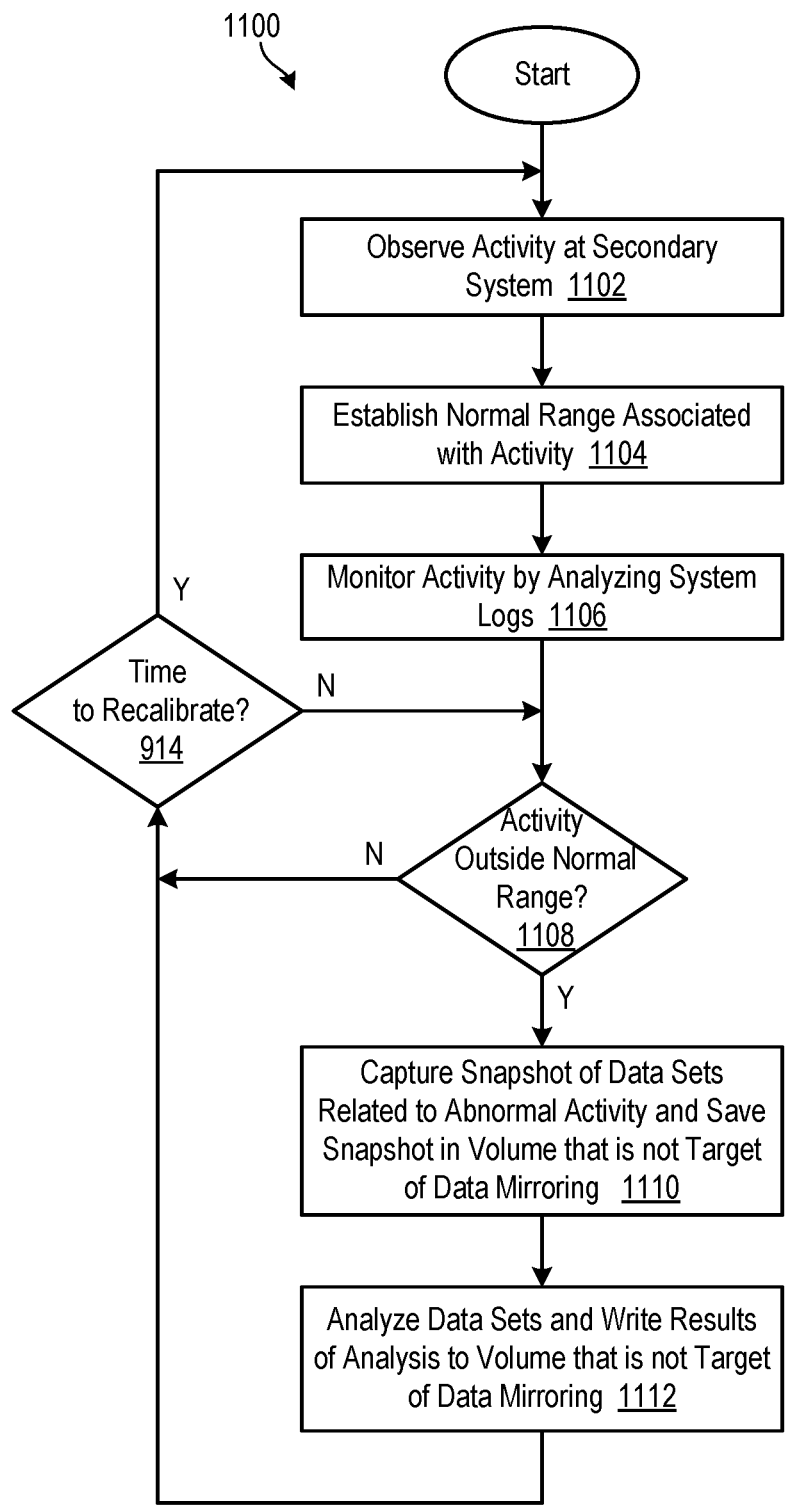
FIG. 11 is a flow diagram showing a method that may be executed by the data replication environment of FIG. 10.

Referring to FIG. 11, one embodiment of a method 1100 that may be executed by the data replication environment of FIG. 10 is illustrated. More specifically, such a method 1100 may be executed by the secondary system 800*b*. As shown, the secondary system 800*b* initially observes 1102 activity that occurs on the primary system 800*a*. In certain embodiments, this may be accomplished by analyzing system logs 320 that are mirrored from the primary system 800*a* to the secondary system 800*b*. Upon observing this activity, the secondary system 800*b* establishes 1104 normal ranges for activity that is observed on the primary system 800*a*. The steps 1102 and 1104 may be considered a learning period 400 wherein the secondary system 800*b* learns the normal operation of the primary system 800*a*.

The secondary system 800*b* then monitors 1106 activity that occurs on the primary system 800*a* by analyzing system logs 320 that are mirrored to the secondary system 800*b*. In the event the secondary system 800*b* detects 1108 activity that falls outside the normal ranges, the secondary system 800*b* captures 1110 a snapshot 1000 of data sets that are related to the abnormal activity and saves 1110 the snapshot 1000 in a volume 1002 that is not a target of data mirroring. The secondary system 800*b* may then analyze the snapshot 1000 and write the results of the analysis to a volume 1002 that is also not a target of data mirroring. Periodically, such as every interval or after configuration changes have occurred on the primary system 800*a*, the secondary system 800*b* recalibrates 1114 by repeating the learning period 400 and observing what is considered normal on the primary system 800*a*.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for more effectively utilizing computing resources in a data replication environment, the method comprising:
   detecting, at a primary system, activity occurring on the primary system;
   recording the activity in system logs located at the primary system;
   using at least one of a synchronous and asynchronous data replication system with failover capability, automatically mirroring the system logs from the primary system to a secondary system to maintain two consistent copies of the system logs across the primary system and the secondary system;
   analyzing the system logs at the secondary system;
   in the event abnormal activity is detected in the system logs at the secondary system, identifying, on the secondary system, a data set containing production data that is associated with the abnormal activity and used to complete day-to-day business tasks and processes; and
   taking, on the secondary system, a snapshot of the data set and saving the snapshot on the secondary system.

2. The method of claim 1, wherein saving the snapshot comprises saving the snapshot to a volume on the secondary system that is not a target of data mirroring.

3. The method of claim 2, further comprising analyzing the snapshot to determine a cause of the abnormal activity.

4. The method of claim 1, wherein analyzing the system logs comprises writing results of the analysis to a volume on the secondary system that is not a target of data mirroring.

5. The method of claim 1, further comprising observing the activity occurring on the primary system over a period of time to determine what is considered abnormal activity.

6. The method of claim 1, further comprising, in the event abnormal activity is detected in the system logs at the secondary system, automatically sending, from the secondary system to the primary system, at least one command that is designed to address the abnormal activity.

7. The method of claim 6, wherein the at least one command comprises at least one of a command to gather additional information on the primary system, and a command to tune the primary system.

8. A computer program product for more effectively utilizing computing resources in a data replication environment, the computer program product comprising a computer-readable storage medium having computer-usable program code embodied therein, the computer-usable program code configured to perform the following when executed by at least one processor:
   detect activity occurring on a primary system;
   record the activity in system logs located at the primary system;
   using at least one of a synchronous and asynchronous data replication system with failover capability, automatically mirror the system logs from the primary system to a secondary system to maintain two consistent copies of the system logs across the primary system and the secondary system;
   analyze the system logs at the secondary system;
   in the event abnormal activity is detected in the system logs at the secondary system, identify, on the secondary system, a data set containing production data that is associated with the abnormal activity and used to complete day-to-day business tasks and processes; and
   take, on the secondary system, a snapshot of the data set and save the snapshot on the secondary system.

9. The computer program product of claim 8, wherein saving the snapshot comprises saving the snapshot to a volume on the secondary system that is not a target of data mirroring.

10. The computer program product of claim 9, wherein the computer-usable program code is further configured to analyze the snapshot to determine a cause of the abnormal activity.

11. The computer program product of claim 8, wherein analyzing the system logs comprises writing results of the analysis to a volume on the secondary system that is not a target of data mirroring.

12. The computer program product of claim 8, wherein the computer-usable program code is further configured to observe the activity occurring on the primary system over a period of time to determine what is considered abnormal activity.

13. The computer program product of claim 8, wherein the computer-usable program code is further configured to, in the event abnormal activity is detected in the system logs at the secondary system, automatically send, from the secondary system to the primary system, at least one command that is designed to address the abnormal activity.

14. The computer program product of claim 13, wherein the at least one command comprises at least one of a command to gather additional information on the primary system, and a command to tune the primary system.

15. A system for more effectively utilizing computing resources in a data replication environment, the system comprising:
  at least one processor;
  at least one memory device coupled to the at least one processor and storing instructions for execution on the at least one processor, the instructions causing the at least one processor to:
    detect activity occurring on a primary system;
    record the activity in system logs located at the primary system;
    using at least one of a synchronous and asynchronous data replication system with failover capability, automatically mirror the system logs from the primary system to a secondary system to maintain two consistent copies of the system logs across the primary system and the secondary system;
    analyze the system logs at the secondary system;
    in the event abnormal activity is detected in the system logs at the secondary system, identify, on the secondary system, a data set containing production data that is associated with the abnormal activity and used to complete day-to-day business tasks and processes; and
    take, on the secondary system, a snapshot of the data set and save the snapshot on the secondary system.

16. The system of claim 15, wherein saving the snapshot comprises saving the snapshot to a volume on the secondary system that is not a target of data mirroring.

17. The system of claim 16, wherein the instructions further cause the at least one processor to analyze the snapshot to determine a cause of the abnormal activity.

18. The system of claim 15, wherein the instructions further cause the at least one processor to observe the activity occurring on the primary system over a period of time to determine what is considered abnormal activity.

19. The system of claim 15, wherein the instructions further cause the at least one processor to, in the event abnormal activity is detected in the system logs at the secondary system, automatically send, from the secondary system to the primary system, at least one command that is designed to address the abnormal activity.

20. The system of claim 19, wherein the at least one command comprises at least one of a command to gather additional information on the primary system, and a command to tune the primary system.

\* \* \* \* \*